United States Patent
Marlin et al.

(10) Patent No.: US 8,895,203 B2
(45) Date of Patent: Nov. 25, 2014

(54) POWDER CONTAINING ELONGATED GRAINS AND THE USE THEREOF FOR PRODUCING AN ELECTRODE FOR A SOLID OXIDE FUEL CELL

(75) Inventors: Samuel Marlin, Plan d'Orgon (FR);
Caroline Levy, Montpellier (FR);
Michael Mahoney, Holliston, MA (US)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 1286 days.

(21) Appl. No.: 12/677,725

(22) PCT Filed: Sep. 12, 2008

(86) PCT No.: PCT/FR2008/051635
§ 371 (c)(1),
(2), (4) Date: May 6, 2010

(87) PCT Pub. No.: WO2009/047421
PCT Pub. Date: Apr. 16, 2009

(65) Prior Publication Data
US 2010/0216047 A1    Aug. 26, 2010

(30) Foreign Application Priority Data
Sep. 14, 2007 (FR) ..................... 07 57565

(51) Int. Cl.
| | | |
|---|---|---|
| *H01M 4/48* | (2010.01) | |
| *H01M 8/10* | (2006.01) | |
| *H01M 4/13* | (2010.01) | |
| *H01M 4/58* | (2010.01) | |
| *H01M 8/00* | (2006.01) | |
| *C04B 35/00* | (2006.01) | |
| *H01M 4/88* | (2006.01) | |
| *H01M 4/86* | (2006.01) | |
| *H01M 4/90* | (2006.01) | |
| *H01M 8/12* | (2006.01) | |

(52) U.S. Cl.
CPC .......... *H01M 4/8885* (2013.01); *H01M 4/8605* (2013.01); *H01M 4/8621* (2013.01); *H01M 4/9016* (2013.01); *H01M 4/9025* (2013.01); *H01M 4/9033* (2013.01); *H01M 4/9066* (2013.01); *H01M 4/8652* (2013.01); *H01M 2008/1293* (2013.01); *Y02E 60/525* (2013.01); *Y02E 60/50* (2013.01)
USPC ........................................ 429/489

(58) Field of Classification Search
USPC ........ 429/218.1, 223, 224, 231.5, 489, 231.6, 429/535; 501/135
See application file for complete search history.

(56) References Cited

U.S. PATENT DOCUMENTS

| | | | | |
|---|---|---|---|---|
| 5,654,115 | A  * | 8/1997 | Hasebe et al. ............. | 429/218.2 |
| 6,322,926 | B1 * | 11/2001 | Kasashima et al. ........ | 429/218.2 |
| 7,431,758 | B2 * | 10/2008 | Ota et al. .......................... | 106/3 |
| 8,163,669 | B2 * | 4/2012 | Hampden-Smith et al. .. | 502/439 |
| 2004/0023113 | A1 | 2/2004 | Suhara et al. | |
| 2007/0082254 | A1 | 4/2007 | Hiwatashi | |

FOREIGN PATENT DOCUMENTS

| | | |
|---|---|---|
| EP | 0 545 757 A1 | 6/1993 |
| EP | 0 568 281 A1 | 11/1993 |
| EP | 0 593 281 A2 | 4/1994 |
| EP | 0 806 397 A1 | 11/1997 |
| EP | 1 598 892 A1 | 11/2005 |
| EP | 1 796 191 A1 | 6/2007 |
| JP | A-10-069910 | 3/1998 |
| JP | A-10-114570 | 5/1998 |
| JP | A-10-144323 | 5/1998 |
| JP | A-2001-122626 | 5/2001 |
| JP | A-2003-505326 | 2/2003 |
| JP | A-2004-186119 | 7/2004 |
| WO | WO 01/07368 A1 | 2/2001 |
| WO | WO 01/92158 A1 | 12/2001 |
| WO | WO 2004/093235 A1 | 10/2004 |

OTHER PUBLICATIONS

International Preliminary Report on Patentability issued for International Application No. PCT/FR2008/051635 on Apr. 7, 2010 (with translation).
International Search Report issued for International Application No. PCT/FR2008/051635 on Mar. 20, 2009 (with translation).
Jul. 9, 2013 Notice of Reasons for Rejection issued in Japanese Application No. 2010-524551 with English-language translation.

* cited by examiner

*Primary Examiner* — Patrick Ryan
*Assistant Examiner* — Julian Anthony
(74) *Attorney, Agent, or Firm* — Oliff PLC (57) ABSTRACT

The present invention provides a powder constituted by a set of grains, characterized in that the 10 percentile of the cumulative granulometric distribution of the grain sizes, commencing from the fines, $D_{10}$, is 4 μm or more, at least 40% by number of the grains having a form factor R between the length and the width of more than 1.5.

51 Claims, 3 Drawing Sheets

POWDER CONTAINING ELONGATED GRAINS AND THE USE THEREOF FOR PRODUCING AN ELECTRODE FOR A SOLID OXIDE FUEL CELL

TECHNICAL FIELD

The present invention relates to a powder for the production of a porous material, in particular to produce solid oxide fuel cell (SOFC) elements, and in particular an electrode of such a cell.

PRIOR ART

Conventionally, the porosity of a material depends on the arrangement of the grains relative to one another. It may also be increased by adding pore-forming agents that are subsequently eliminated by heat treatment, leaving additional interstices in their place.

Said elimination of pore-forming agents, however, frequently results in unacceptable defects, in particular cracks, or in poor control over porosity. Studies have thus been undertaken aimed at avoiding the use of pore-forming agents, in particular in order to optimize the arrangement of the grains, termed "compaction". These studies have lead to the observation and to the technical prejudice that an increase in porosity causes a reduction in strength.

Thus, there is a need for a powder that makes it possible to limit the quantity of pore-forming agents, or even to dispense with any addition of pore-forming agents, while improving the compromise between total porosity and strength.

Further, fuel cells or materials suitable for use in the production of fuel cells are described in WO2004/093235, EP 1 796 191, US 2007/0082254, EP 1 598 892, EP 0 593 281, EP 0 568 281, or EP 0 545 757. None of those documents either describes or suggests the use of elongate grains to create porosity.

One aim of the invention is to satisfy the need outlined above.

SUMMARY OF THE INVENTION

In accordance with the invention, this aim is achieved by means of a powder having a 10 percentile, $D_{10}$, in the cumulative granulometric distribution of the grain sizes, with grain sizes being classified by increasing size, which is 4 micrometers or more, at least 40%, preferably at least 50%, more preferably at least 60%, still more preferably at least 70% of the grains of the powder, as a percentage by number, having a form factor R of more than 1.5, the form factor of a grain being the ratio L/W between the length L and the width W of said grain.

As can be seen in more detail from the remainder of the description, such a powder, below termed a "powder with elongated grains", or "powder of the invention", is suitable to make a porous material having, for comparable total porosity, a strength that is far superior to that of a porous material obtained from a powder without these characteristics.

In particular, the grains may be formed from a material selected from ceramics, metals, cermets, and mixtures thereof. They may also be used in an electrical conductive or semiconductive material.

The powder of the invention is thus entirely suitable for applications where a high total porosity, for example in the range 25% to 50%, and good strength are necessary, such as for the production of SOFC type cell electrodes, for example.

The powder of the invention may also have one or more of the following optional characteristics:

the form factor R distribution is such that:
less than 90%, or even less than 80% of the grains of the powder have a form factor R of more than 1.5; and/or
at least 10%, or even at least 20% and/or less than 60%, or even less than 40% of the grains of the powder have a form factor R of more than 2; and/or
at least 5%, or even at least 10% and/or less than 40%, or even less than 20% of the grains of the powder have a form factor R of more than 2.5; and/or
at least 2%, or even at least 5% and/or less than 20%, or even less than 10% of the grains of the powder have a form factor R of more than 3, the percentages being percentages by number;

$D_{10}$ is more than 6 micrometers, or even more than 8 micrometers, and/or less than 50 μm [micrometer] or even less than 30 μm, or even less than 20 μm. A percentile $D_{10}$ of approximately 10 micrometers is especially preferred;

The 50 percentile, $D_{50}$, is more than 10 micrometers, or even more than 20 micrometers and/or less than 100 micrometers, or even less than 50 micrometers, or even less than 40 μm, or even less than 30 micrometers. Preferably, $D_{50}$ is equal to approximately 25 micrometers;

The 90 percentile, $D_{90}$, is more than 30 μm, or even more than 40 μm, and/or is less than 150 micrometers, or even less than 100 micrometers or even less than 80 micrometers. Preferably, $D_{90}$ is equal to approximately 50 micrometers;

The 99.5 percentile, $D_{99.5}$, also termed the "maximum size", of the powder grains, is less than 200 μm, or even less than 150 μm or even less than 110 μm. This maximum size is selected as a function of the application;

In particularly advantageous embodiments, more than 90%, or even more than 95%, or even more than 99% as a percentage by weight of the powder is constituted by a substance selected from:
a manganese perovskite;
a lanthanum perovskite;
a mixture of manganese perovskite and lanthanum perovskite;
a lanthanum-cobalt perovskite ($LaCoO_3$);
a lanthanum-iron perovskite ($LaFeO_3$);
a lanthanum-manganese perovskite ($LaMnO_3$);
a praseodymium-manganese perovskite;
a strontium-doped samarium cobaltite;
a lanthanide nickelate;
a mixture of ruthenium bismuth and erbium bismuth;
a mixture of lanthanum perovskite and cubic zirconia;
a chromite;
a lanthanum titanate;
a [niobium-doped strontium] titanate;
a [yttrium-doped strontium] titanate;
a [strontium-doped lanthanum] chromo-manganite;
a monoclinic zirconia ($ZrO_2$);
a partially stabilized zirconia ($ZrO_2$);
a cubic zirconia ($ZrO_2$);
cerium oxide ($CeO_2$);
cerium oxide ($CeO_2$) doped with samarium oxide ($Sm_2O_3$) and/or with gadolinium oxide ($Gd_2O_3$);
a cermet comprising cerium oxide ($CeO_2$);
a cermet comprising [strontium-doped lanthanum] chromite;
a cermet comprising partially stabilized zirconia ($ZrO_2$);
a cermet comprising cubic zirconia ($ZrO_2$).

Preferably, said substance is selected from:
  a manganese perovskite;
  a lanthanum perovskite;
  a mixture of manganese perovskite and lanthanum perovskite;
  a [strontium and/or calcium and/or magnesium and/or yttrium and/or ytterbium and/or cerium-doped lanthanum]-manganese perovskite;
  a co-doped lanthanum-manganese perovskite with formula $La_{1-x-w}$ $(Ca)_{0.2}$ $(Ce)_{w+z}$ $(Mn)_{1-y}$ $(Ms2)_y$ $O_3$ where Ms2 is selected from nickel (Ni) and/or chromium (Cr) and/or magnesium (Mg), and $0.15<x<0.25$, x preferably being approximately 0.2, $0.1<w<0.2$; $0.03<y<0.2$ and $0<z<0.005$;
  a [strontium-doped lanthanum]-cobalt perovskite;
  a [strontium and cobalt-doped lanthanum]-iron perovskite;
  a lanthanum and/or praseodymium and/or neodymium nickelate;
  a chromite;
  a [strontium and/or manganese and/or gallium-doped lanthanum] titanate;
  a [strontium-doped lanthanum] chromo-manganite;
  a partially stabilized zirconia;
  a cubic zirconia;
  a cermet comprising cerium oxide ($CeO_2$);
  a [strontium-doped lanthanum] ruthenium-chromite cermet;
  a cermet comprising partially stabilized zirconia ($ZrO_2$);
  a cermet comprising cubic zirconia ($ZrO_2$).
More preferably, said substance is selected from:
  a [strontium and/or calcium-doped lanthanum]-manganese perovskite, preferably with formula $(La_{(1-x)}M_x)_{(1-y)}MnO_{3-\delta}$ where M is selected from the group composed of strontium, calcium and mixtures thereof, ($0<x$ and/or $x<0.5$) and ($-0.1\leq y$ and/or $y\leq 0.24$) and δ ensures electroneutrality, M preferably being strontium;
  a lanthanum chromite ($LaCrO_3$);
  a zirconia partially stabilized with yttrium oxide ($Y_2O_3$) and/or with scandium oxide ($Sc_2O_3$) and/or with cerium oxide ($CeO_2$);
  a cubic zirconia;
  a cermet comprising cerium oxide ($CeO_2$) doped with samarium oxide, ($Sm_2O_3$), and/or with gadolinium oxide ($Gd_2O_3$);
  a cermet comprising zirconia ($ZrO_2$) partially stabilized with yttrium oxide ($Y_2O_3$);
  a cermet comprising cubic zirconia stabilized with yttrium oxide ($Y_2O_3$).
More preferably, said substance is selected from:
  a [strontium-doped lanthanum]-manganese perovskite;
  a strontium-doped lanthanum chromite;
  a zirconia partially stabilized with yttrium oxide;
  a cubic zirconia stabilized with yttrium oxide ($Y_2O_3$) and/or scandium oxide ($Sc_2O_3$) and/or cerium oxide ($CeO_2$);
  a cermet of [nickel or cobalt or copper or ruthenium or iridium]-cerium oxide ($CeO_2$) doped with samarium oxide ($Sm_2O_3$) and/or with gadolinium oxide ($Gd_2O_3$);
  a cermet of [nickel or cobalt or copper or ruthenium]-zirconia partially stabilized with yttrium oxide, preferably a cermet of nickel-zirconia partially stabilized with yttrium oxide;
  a cermet of [nickel or cobalt or copper or ruthenium]-cubic zirconia stabilized with yttrium oxide.

More preferably, said substance is selected from:
  a [strontium-doped lanthanum]-manganese perovskite with formula $(La_{(1-x)}Sr_x)_{(1-y)}MnO_{3-\delta}$ in which ($0.15<x$ and/or $x<0.35$) and ($0\leq y$ and/or $y\leq 0.1$) and δ ensures electroneutrality;
  a partially stabilized zirconia with a molar yttrium oxide content in the range 3% to 8%;
  a cubic zirconia stabilized with yttrium oxide;
  a cermet of nickel-partially stabilized zirconia with a molar yttrium oxide content in the range 3% to 8%;
  a cermet of nickel-cubic zirconia stabilized with yttrium oxide.
More preferably, said substance is selected from:
  a [strontium-doped lanthanum]-manganese perovskite with formula $(La_{0.8}Sr_{0.2})_{(1-y)}MnO_{3-\delta}$ in which ($0\leq y$ and/or $y\leq 0.1$) and δ ensures electroneutrality;
  a stabilized cubic zirconia with a molar yttrium oxide ($Y_2O_3$) content in the range 8% to 10%;
  a cermet of nickel-cubic zirconia stabilized with a molar yttrium oxide in the range 8% to 10%;
Further, said substance may be formed by a mixture of the compounds mentioned in the six above lists;
Finally and still preferably, said powder is advantageously constituted by a lanthanum-manganese perovskite, in particular to produce a cathode of a SOFC cell. It may also be constituted by a [strontium-doped lanthanum]-manganese perovskite with formula $(La_{0.8}Sr_{0.2})_{(1-y)}MnO_{3-\delta}$ in which ($0\leq y$ and/or $y\leq 0.1$) and δ ensures electroneutrality;
Preferably, the grains of powder not comprising one of these substances are unwanted grains, such as iron particles introduced on milling, and representing less than 1% by weight of the grains of the powder;
Preferably, the constituents of the grains of the powder that are different from the preferred above-mentioned substances are impurities, generally introduced with the starting materials during production, but that are unwanted. They preferably represent less than 1% by weight of the powder, preferably less than 0.7%;
Preferably, the grains of the powder are "fused" grains, i.e. obtained by a method employing melting of the starting materials and solidification by cooling. Preferably, the grains of the powder result from milling one or more fused solid bodies. Still preferably, the mill used is a roller grinding mill.

The invention also provides the substances listed above in any form, for example in the form of a block, a bead or a powder particle, provided that they are obtained by a fusion method. Advantageously, such a method allows said substances to be produced on an industrial scale and in a good yield.

The invention also provides a method of producing a powder of the invention comprising at least the following steps:
  a) synthesizing a solid body, preferably by sintering, isostatic sintering ("IP"), hot isostatic pressing ("HIP"), SPS ("Spark Plasma Sintering" or flash sintering), or fusion, fusion being the most preferred synthesis pathway;
  b) optionally, reducing said solid body into a set of particles, optionally by crushing;
  c) preferably, selecting, for example by screening, particles with a size greater than the maximum size of the grains, $D_{99.5}$, of the powder to be produced and/or less than 100 times this maximum size, preferably less than 10 times this maximum size, more preferably less than 4 times said size;
  d) milling the solid body obtained in step a) or the particles obtained in step b) or in step c) to obtain a powder of the invention, preferably under conditions that encourage shear stresses, in particular using a roller grinding mill.

In a preferred embodiment, in order to produce a powder of the invention that can pass through a square mesh screen with mesh size O2 (the mesh size designating the length of the side of the mesh), in step c), particles that do not pass through a square mesh screen with mesh size O1 and pass through a square mesh screen with mesh size O3 are selected, O1 being larger than O2 and O3 preferably being less than a hundred times O2, preferably less than ten times O2, more preferably less than four times O2.

Alternatively, the method of the invention also comprises one or more of optional steps e), f) and g) below:

e) selecting grains deriving from step d) and belonging to granulometric ranges determined according to the envisaged application;

f) de-ironing in order to eliminate any possible magnetic particles introduced during the milling carried out in step d);

g) checking the quality of the powder, preferably by sampling.

In step a), the solid body may be at least on the millimeter scale, i.e. such that all of the dimensions exceed at least 1 mm [millimeter]. Alternatively, and in particular to produce powders passing through a 53 μm square mesh screen, bodies that have at least one dimension of less than 1 mm are preferably used, preferably beads with a major diameter of less than 500 μm, or even less than 100 μm and preferably not passing through a 53 μm mesh size square mesh screen. Using such beads has proved to be especially efficacious.

The invention also provides a powder produced using a production method according to the invention.

The invention also provides a mixture of a first powder according to the invention formed from a first substance and a second powder formed from a second substance that is different from said first substance. Preferably, the quantity of powder of the invention is 30% or more, or 50% or more, or 60% or more, by weight of the mixture. The powder of the invention may in particular be a zirconia powder, for example selected between screens with a mesh size in the range 20 μm to 53 μm. The second powder may in particular be a nickel oxide powder, NiO. The particles of the second powder are preferably substantially spherical and the median size of said second powder is preferably less than 10 μm, more preferably approximately 1 μm.

The mixture may be constituted by said first and second powders.

The invention in particular provides a mixture of 60% of a zirconia powder according to the invention, and 40% of NiO powder. Said mixture is suitable to produce porous parts which demonstrate good mechanical strength.

When a powder accoding to the invention is such that more than 40% by number of its grains have a form factor R of more than 1.5, substantially spherical grains, i.e. with a median form factor in the range 1 to 1.3, may be added, provided that the powder obtained remains in accordance with the invention. Advantageously, the strength can be improved thereby, the total porosity remaining acceptable for producing an electrode of a SOFC type cell.

The invention also provides a method of producing a powder, said method including an operation of mixing a first powder according to the invention in which more than 40% by number of the grains have a form factor (R) of more than 1.5 with a second powder of grains with a median form factor (R*) in the range 1 to 1.3, the quantity of said second powder being determined such that the powder that is produced is in accordance with the invention.

Preferably, the quantity of said second powder represents 0 to 40% of the weight of the produced powder.

Still preferably, at least one of said first and second powders, preferably both, has (have) a chemical formula of the type $(La_{(1-x)}M_x)_{(1-y)}MnO_{3-\delta}$ where M is selected from the group composed of strontium, calcium and mixtures thereof, ($0<x$ and/or $x<0.5$) and ($-0.1 \leq y$ and/or $y \leq 0.24$) and $\delta$ ensures electroneutrality.

In general, the two said first and second powders may have the same composition.

In a particular embodiment, the second powder has a cumulative granulometric distribution in accordance with that of a powder according to the invention.

The invention also relates to the use of a powder according to the invention, or of a powder produced or expected to be produced using a method according to the invention, for the production of porous materials, in particular in the form of porous layers, especially in the form of layers with a thickness of less than 2 mm, less than 1 mm or less than 500 μm, or even of a still smaller thickness, said porous materials possibly having a total porosity of more than 20%, preferably more than 25%, or even more than 30% or 40%, and even reaching 50%. The open porosity may be in the range 25% to 50%, preferably in the range 30% to 45%, more preferably in the range 30% to 40%. These porous materials may have a biaxial bending strength or more than 20 MPa [mega pascals], or even more than 24 MPa measured using ASTM standard C1499-05, especially for [strontium-doped lanthanum]-manganese perovskite materials. A powder of the invention may thus in particular be used for the production of solid oxide fuel cells (SOFC), in particular for the production of cathodes for said cells.

Thus, the invention also relates to the use according to a powder of the invention, or of a powder produced or capable of being produced using a method according to the invention, in the production of electrodes for solid oxide fuel cells (SOFC).

The invention also provides a worked product obtained from a powder according to the invention, in particular a green part, and a sintered product obtained by sintering said green part. Advantageously, said sintered product may have a total porosity after sintering of more than 20%, preferably in the range 25% to 50% by volume, more preferably in the range 30% to 45%, still more preferably in the range 30% to 40% by volume. The sintered product may in particular be in the form of a layer with a thickness in the range 1 mm to 2 mm, or even with a thickness of less than 500 μm.

In particular, the present invention provides an electrode, i.e. a cathode or an anode, produced from a powder according to the invention. The quantity of elongated grains of lanthanum-manganese perovskite is thus determined in order to generate a total porosity in the cathode of at least 20% of the total volume of said cathode.

The invention also provides an element, termed an "elementary cell", of a solid oxide fuel cell comprising a cathode intended to be in contact with a gaseous source of oxygen or containing oxygen, an anode intended to be in contact with a gaseous fuel, and an electrolyte disposed between the anode and the cathode. According to the invention, this cathode and/or this anode are produced from a powder of the invention or from a green part in accordance with the invention. The powder used may in particular be a lanthanum-manganese perovskite for the cathode.

The invention also provides a solid oxide fuel cell (SOFC) generally comprising a stack of elementary cells, at least one cell, preferably all of the cells, being in accordance with the invention.

Preferably, the cell comprises at least two elementary cells and an electrical interconnector, which is preferably flat, and more preferably with a thickness in the range 10 μm to 1000 μm, or even less than 200 μm, disposed between said elementary cells.

Preferably, the cell comprises a plurality of elementary cells connected electrically in series.

The invention also provides a method of producing a sintered porous product and a method of producing an electrode, in particular a cathode of an elementary cell of the invention, said methods comprising the following steps in succession:
A) preparing a powder according to the invention;
B) shaping said powder to obtain a shaped powder;
C) sintering said shaped powder.

The powder used in step A) may in particular be produced using a method of the invention as described above.

The powder used in step A) may in particular be a lanthanum-manganese perovskite powder, which may optionally be doped, in particular with strontium.

The invention also provides a method of producing an elementary cell of fuel cells, comprising the following steps:
1) producing, using a method in accordance with steps A) to C) above, a cathode intended to be in contact with a source of gaseous oxygen and an anode intended to be in contact with a gaseous fuel; and
2) producing and positioning an electrolyte between the cathode and the anode.

Finally, the invention provides a method of producing a stack of elementary cells of a solid oxide fuel cell (SOFC), a solid oxide fuel cell comprising, as is conventional, one or more elementary cell(s), generally constituted by an anode in the form of a layer, a cathode in the form of a layer, and a layer of electrolyte disposed in contact between the anode and the cathode. According to the invention, the cathode layer and/or the anode layer are obtained by sintering a powder according to the invention.

Definitions

The term "form factor" R denotes the ratio between the largest apparent dimension, or "length" L, and the smallest apparent dimension, or "width" W, of a grain. The length and the width of a grain are conventionally measured using the following method. After taking a representative sample of the grains of a powder, these grains are partially embedded in resin and are polished in order to render observation of the polished surface possible. The form factor measurements are carried out on images of these polished surfaces, these images being acquired with a scanning electron microscope (SEM) using secondary electrons, with an acceleration voltage of 10 kV [kilovolt] and a magnification of ×100 (and so 1 pixel represents 1 μm on the SEM employed). These images are preferably acquired in zones where the grains are separated the best, in order to facilitate subsequent determination of the form factor. The largest apparent dimension, termed the length L, and the smallest apparent dimension, termed W, are measured for each grain of each image. Preferably, these dimensions are measured using image processing software such as VISILOG sold by NOESIS. For each grain, the form factor R=L/W is calculated. The distribution of the form factor for the powder may then be determined from the set of measurements carried out for the form factor R.

The term "median form factor" R* of a set of grains denotes the value of the form factor for which 50% by number of the grains have a form factor of less than this value and for which 50% by number of the grains have a form factor that is greater than that value.

The "apparent density expressed as a function of the theoretical density" and the "total porosity by volume" are measured for the various layers of a stack of elementary cells using the following method: the stack comprising at least one elementary cell is cut along its thickness, which means that the various layers composing said stack are exposed. The sectional plane exposing all of the layers is observed using a scanning electron microscope (SEM). Regions in the various layers are randomly selected. Typically, 6 regions with the same surface area are randomly selected for each layer observed. Typically, the dimensions of said regions are 550 micrometers×550 micrometers for a cathode layer and 20 micrometers×20 micrometers for a functional cathode layer. From the observation for each region, it is possible to determine the surface area covered by the substance (which is generally white in color) and the surface area covered by the pores (generally dark in color). For each region, it is then possible to determine the following parameters:
the "local" density, as a percentage of the theoretical density, which is equal to the surface area covered by the substance divided by the total surface area of the region under consideration;
the total "local" porosity, equal to the surface area covered by the pores divided by the total surface area of the region under consideration.

The density of the layer under consideration, expressed as a percentage of the theoretical density, is equal to the mean of the local densities. The total porosity by volume of the layer under consideration is equal to the mean of the local total porosities.

The term "grain size" means the size of a grain given conventionally by characterization of the granulometric distribution carried out using a laser granulometer. The laser granulometer used was a Partica LA-950 from HORIBA.

The 10 ($D_{10}$), 50 ($D_{50}$), 90 ($D_{90}$) and 99.5 ($D_{99.5}$) percentiles or "centiles" are the grain sizes corresponding to the 10%, 50%, 90%, and 99.5% percentages by volume respectively on the cumulative granulometric distribution curve of the grain sizes of the powder, the grain sizes being classified in increasing order. As an example, 10% by volume of the grains of the powder have a size of less than $D_{10}$ and 90% of the grains by volume have a size of more than $D_{10}$. The percentiles may be determined with the aid of a granulometric distribution produced using a laser granulometer.

The term "maximum size of the grains of a powder" denotes the 99.5 percentile ($D_{99.5}$) of said powder.

The term "median size of the grains of a powder" denotes the 50 percentile ($D_{50}$) of said powder.

The term "partially stabilized zirconia" denotes a zirconia that is neither completely monoclinic nor completely cubic (i.e. completely stabilized). A "partially stabilized zirconia" thus must have at least two of the monoclinic, quadratic and cubic crystallographic forms or be completely quadratic in form.

The term "lanthanum-manganese perovskite" denotes a lanthanum-manganese perovskite that may optionally be doped.

Conventionally, the term "cermet" denotes a composite material containing both a ceramic phase and a metallic phase.

The "electrical conductors" include electronic conductors, ionic conductors and mixed conductors (ionic and electronic).

In the various formulas, δ may be in the range −0.2 to 0.2, and in particular it may be zero.

The term "bead" means a particle having a sphericity, i.e. a ratio between its smallest diameter and its largest diameter, of more than 0.7, regardless of the manner in which said sphericity has been obtained. The largest and the smallest diameters are the largest and smallest dimensions of the bead.

To the inventors' knowledge, prior art powders do not have at least 40% by number of beads with a sphericity of less than 0.7.

BRIEF DESCRIPTION OF THE FIGURES

Other characteristics and advantages of the invention become apparent from the following description and an examination of the accompanying drawings in which.

DETAILED DESCRIPTION OF AN EMBODIMENT OF THE INVENTION

As explained above, a powder of the invention may be produced by following steps a) to g) described above.

In step a), the aim is to produce solid bodies with a sufficient strength to "burst" during milling. In other words, the solid bodies cannot be simple agglomerations of grains that might crumble during milling, since such crumbling would not allow sufficient elongated grains to be produced for industrial use. Any synthesis method may be envisaged; simple tests may be used to investigate the most favorable conditions. Blowing a molten composition is very suitable.

In step b), which is optional, the solid bodies are reduced, for example crushed, in order to increase the quantity of particles that can be selected during optional step c).

Step c), which is optional, is aimed at guaranteeing that after explosion of the particles introduced into the mill, the grains obtained at the outlet from the mill have sufficient sizes to allow the powder to remain relatively coarse and capable of satisfying the criterion regarding the 10 percentile ($D_{10} \geq 4$ μm).

To this end, the minimum size of the solid bodies or the particles entering the mill may be at least greater, preferably less than a hundred times greater, than the maximum size of the grains of the powder to be produced, preferably less than ten times greater than the maximum size of the grains of the powder to be produced, more preferably less than four times greater than the maximum size of the grains of the powder to be produced.

In a preferred embodiment, in order to produce a powder of the invention that is capable of passing through a square mesh screen with mesh size O2 (the mesh size designating the length of the side of the mesh), in step c), particles that do not pass through a square mesh screen with mesh size O1 and that pass through a square mesh screen with mesh size O3 are selected, O1 being larger than O2, and O3 preferably being less than a hundred times O2, preferably less than ten times O2, more preferably less than 4 times O2.

In step d), a mill that encourages shear stresses is used, preferably a roller grinding mill.

With a roller grinding mill, the separation of the rollers may be adjusted so that the milled powder has a 10 percentile, $D_{10}$, that is greater than or equal to four micrometers, and preferably has one or more of the preferred characteristics mentioned above.

A roller grinding mill is preferred, in particular if the particles introduced into the mill are obtained by crushing a block.

Other types of mill, an particular air jet mills such as those of the jet milling type, may be envisaged. If a mill is not a roller grinding mill, then it must have tests carried out on it in order to verify that it is suitable for the milled material.

With current methods, ball or bead mills are also not suitable for obtaining a large quantity of elongated grains. In fact, those types of mills have the effect of generally reducing the dimension of the grains introduced by also reducing their form factor.

Surprisingly, the inventors have, however, discovered that it is possible to efficiently obtain a powder of the invention by using a ball or bead mill provided that in step d) it mills beads, preferably hollow beads. The method then does not include step b).

If appropriate, in step d), the milling time, the volume of substance and the milling agent in the mill, along with the rotational rate, are adjusted in order to optimize the yield. Preferably, milling is intense but the milling time is limited in order to cause the beads to burst and to create grains with an elongated shape, without reducing the form factor obtained thereby.

The powders of the invention of Examples 2 and 3 are obtained from hollow beads milled in a ball mill.

Preferably, in order to produce a powder according to the invention that passes through a square mesh with mesh size O2, in step d) beads that do not pass through a square mesh screen with a mesh size of O1 and that pass through a square mesh screen with mesh size O3 are used, O1 being greater than O2, and O3 preferably being less than a hundred times O2, preferably less than ten times O2, more preferably less than 4 times O2.

The use of hollow beads may advantageously enable to produce the particles according to the invention with a roller grinding mill or a ball or bead mill, or even an air jet mill.

An optional additional step e) may also be carried out in order to select preferred granulometric ranges, depending on the envisaged application. If necessary, powders having different granulometric distributions and/or percentages of elongated grains may be mixed to obtain a powder according to the invention.

An optional step f) may also be carried out in order to eliminate, by de-ironing, magnetic particles introduced during step d). Preferably, this step is carried out using a high intensity de-ironer. This optional step is not carried out when the powder that is desired is magnetic.

If appropriate, in an optional subsequent step g), the quality of the powder obtained following milling is checked, preferably by sampling, for example using a microscope, a scanning electron microscope or using any known means that allows the shape of the grains to be inspected.

Figure 1:
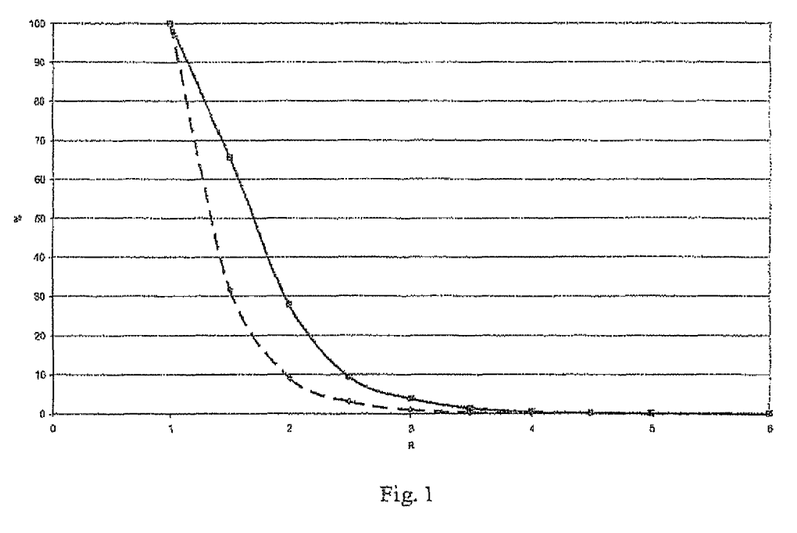
FIG. 1 shows the distribution curves for the form factor R of the powder of Example 1 (continuous line) and of the powder from the comparative example (dashed line), as percentages by number (the percentage by number of the grains shown up the ordinate thereby representing the quantity of grains with a form factor R greater than the corresponding value shown along the abscissa)
Figure 2:
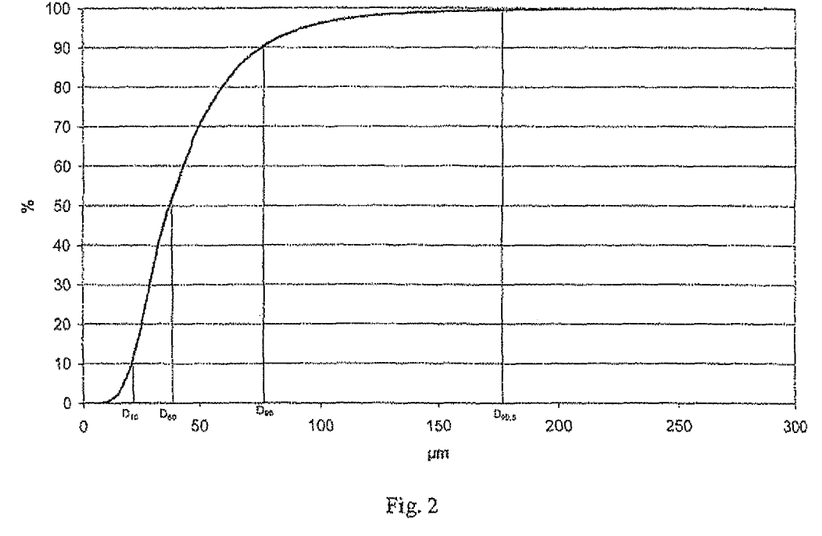
FIG. 2 shows the granulometric distribution curve for the grain sizes of the powder of Example 1 of the invention, the grains being classified by increasing size.
Figure 3:
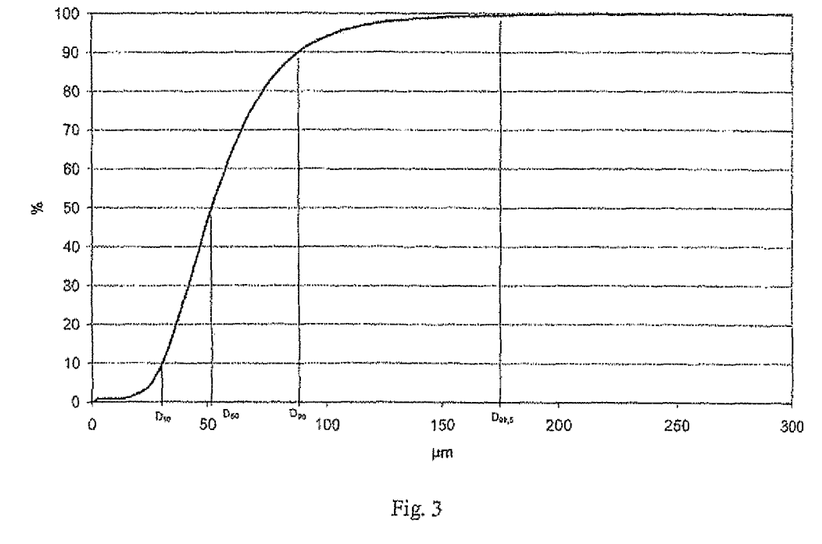
FIG. 3 shows the granulometric distribution curve for the grain sizes of the powder of the comparative example, the grains being classified by increasing size.

At the end of this method, a powder according to the invention is obtained having a cumulative distribution that, as a function of the form factor R, has a profile that is similar to that shown as a solid line in FIG. 1.

Advantageously, the powder of the invention may be used to produce a material with a high total porosity, typically in the range 25% to 50% for powders of [strontium-doped lanthanum]-manganese perovskite, without adding a pore-forming agent. Surprisingly, as is shown in the tests below, the powder of the invention may be used to produce products that have biaxial bending strength that is approximately two times greater (approximately 25 MPa) than the products produced using powders that do not have the characteristics of the invention (which, for an identical total porosity, have biaxial bending strength of the order of 13 MPa).

To this end, the powder of the invention may be sintered using conventional sintering techniques, preferably hot pressing.

The powder of the invention may in particular be used in the context of producing a solid oxide fuel cell (SOFC).

In accordance with one embodiment, the invention provides a method of producing a stack of elementary cells of a solid oxide fuel cell (SOFC). Typically, a solid oxide fuel cell (SOFC) contains one or more elementary cells, generally constituted by an anode, in the form of an anode layer, a cathode in the form of a cathode layer, and a layer of electrolyte, disposed in contact between the cathode and anode layers.

Figure 4:
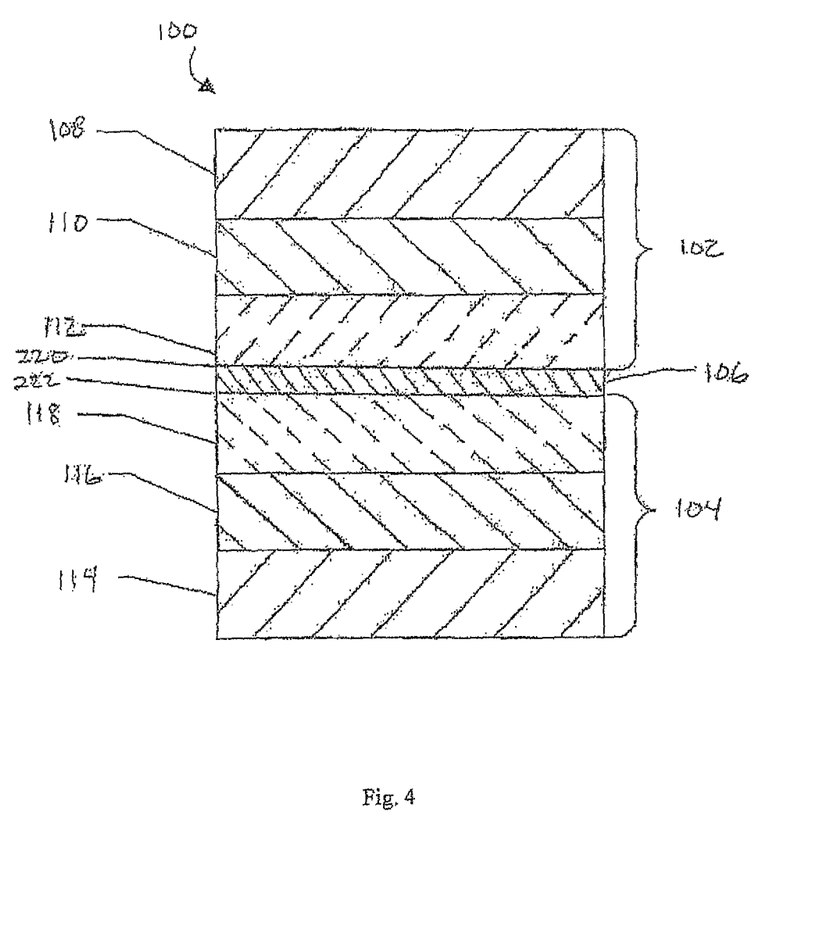
FIG. 4 shows a solid oxide fuel cell (SOFC) in accordance with the invention.

FIG. 4 describes an example of a solid oxide fuel cell (SOFC) 100 produced using a hot pressing method. The solid oxide fuel cell (SOFC) 100 is constituted by a first elementary cell 102, a second elementary cell 104 and an interconnector layer 106 separating said two elementary cells. The first elementary cell 102 is composed of a first electrode layer 108, a layer of electrolyte 110, and a second electrode layer 112. The second elementary layer 104 is composed of a first electrode layer 114, an electrolyte layer 116, and a second electrode layer 118. FIG. 4 in particular illustrates the connection 220 between the interconnector layer 106 and the second electrode layer 112 of the first elementary layer 102. The second connection 222 between the interconnector layer 106 and the second electrode layer 118 of the second elementary cell is also shown. In accordance with the invention, the cathode layer and/or the anode layer are produced by sintering a powder of the invention.

In accordance with one embodiment, the cathode layer is formed from a ceramic oxide or a precursor of that oxide. In particular, as can be seen in the examples, the cathode layer may contain lanthanum and manganese. It may also contain strontium, this formulation generally being known as LSM (strontium-doped lanthanum manganite or lanthanum strontium manganate). As an example, a cathode may be produced from a lanthanum-manganese perovskite with formula $(La_{(1-x)}M_x)_{(1-y)}MnO_{3-\delta}$, where M is selected from the group composed of strontium, calcium and mixtures thereof, ($0 < x$ and/or $x < 0.5$) and ($-0.1 \leq y$ and/or $y \leq 0.24$) and $\delta$ ensures electroneutrality. Preferably $0 \leq y$ and/or $y \leq 0.24$. Preferably M is strontium.

The anode layer may be a cermet, i.e. a material composed of a ceramic phase and a metallic phase, obtained from a powder containing said cermet or a precursor of said cermet. The ceramic phase of the cermet of the anode layer may contain zirconia and the metallic phase may contain nickel. In particular, the ceramic phase may be stabilized zirconia, such as zirconia stabilized with yttrium oxide (YSZ). In particular, the nickel may be obtained by reduction of nickel oxide contained in a precursor of the product constituting the anode layer, the reduction generally resulting from a heat treatment.

Further, the finished electrodes of the elementary cells, anode as well as cathode, generally have a large porosity in order to ensure transport of the gaseous species participating in the oxidation/reduction reactions occurring in the elementary cells. In accordance with one embodiment, the finished electrodes of the elementary cells have a porosity of more than 20% by volume, or more than 30% by volume, or more than 50% by volume, or more than 70% by volume. Preferably, the porosity of the electrodes of the elementary cells is in the range 15% to 70% by volume, preferably in the range 25% to 50% by volume, more preferably in the range 30% to 45% by volume, still more preferably in the range 30% to 40% by volume.

In another embodiment, the electrodes may comprise channels that allow better supply of gas thereto, as well as better evacuation of gases. There is a wide variety of substances suitable for creating such channels inside the anode or cathode layers. In general, these substances are selected so that they burn off or are eliminated during heat treatment and must not react with the ceramic particles. These two conditions are fulfilled by materials based on organic substances, such as organic fibers. They may be natural such as cotton, animal such as wool, or manufactured, such as regenerated cellulose fibers, cellulose diacetate, cellulose triacetate, polyamide, polyester, polyacrylic, polyvinyl, polyolefin resin, carbon or graphite.

As an alternative, the channels may be formed in the electrodes without the use of fibers or products that are eliminated during sintering. These channels may be formed by pressing, molding or any other technique that is known in the art.

The electrolyte layer may be produced using oxides or precursors of said oxides. Materials that are suitable for this application are ceramic oxides and/or precursors of said oxides, such as zirconia ($ZrO_2$), cerine ($CeO_2$), gallium oxide ($Ga_2O_3$), and other known ionic conductors. Oxygen ion conduction may be improved by using stabilizing oxides such as yttrium, scandium, ytterbium, samarium, gadolinium, titanium, cerium, calcium, magnesium, indium, or tin oxides. Preferably, the stabilizing oxides are selected from yttrium, samarium, scandium, indium, and gadolinium oxides, and mixtures thereof. Of the various possible materials, the electrolyte layer may thus be composed, for example, of zirconia stabilized with yttrium oxide, or cerine doped with samarium oxide, or cerine doped with gadolinium oxide, or cerium doped with calcium oxide.

Producing a stack of elementary cells also includes producing ceramic interconnectors in layers and/or precursors of said ceramic interconnectors. A ceramic interconnector layer is intended to connect two adjacent elementary cells together electrically. In contrast to stacks in which the elementary cells are connected in parallel, the ceramic interconnector layer facilitates connection of the elementary cells in series. Chromium-based materials are particularly suited to the production of the ceramic interconnector layer. The chromium-based ceramic materials may also include rare earth elements such as chromites doped with rare earths. In one embodiment, the ceramic interconnector layer may contain lanthanum, strontium, cobalt, gallium, yttrium, and/or magnesium.

Several elementary cells may be produced as described below.

The structure and composition of the elementary cells are preferably substantially similar, or even identical for all cells, in particular as regards the materials of the cathode, anode and electrolyte. Interconnectors connect together the various elementary cells in order to form a stack composed of three, four, five, six, or more than 6 elementary cells.

After producing a first elementary cell, a second elementary cell, and positioning an interconnector layer between the two elementary cells and ensuring an electrical connection between these two elementary cells, the various layers forming the elementary cells and the interconnector undergo hot pressing in order to fasten them together securely. The hot pressing may also be carried out on a stack composed of three, four, five, six or even more than 6 elementary cells, or even on all of the elementary cells necessary for the production of the fuel cell, with an interconnector cell separating each elementary cell and ensuring electrical connection.

Conventionally, the hot pressing technique consists in applying a uniaxial pressure using a piston in order to encourage densification of the various layers of materials. In one embodiment, the maximum pressure applied when pressing the stack of elementary cells is more than 0.5 MPa. As an example, this pressure may be more than 3 MPa, for example more than 5 MPa, for example again more than 8 MPa. The maximum pressure applied during hot pressing may in particular be in the range 0.5 MPa to 10 MPa, for example in the range 1 MPa to 5 MPa. The maximum pressure may be applied for a period of 1 minute to 45 minutes.

Further, the fact that this pressure is applied at a predetermined temperature encourages densification of the various layers. The temperature used for hot pressing is preferably more than 1000° C., for example more than 1050° C., for example more than 1100° C. or 1200° C. Further, this temperature should preferably be less than 1800° C., for example less than 1700° C. or less than 1600° C. Thus, the maximum temperature applied during hot pressing may in particular be in the range 1100° C. to 1700° C. In one embodiment, the elementary cells and the stacks of elementary cells may be hot pressed at temperature ramp-up rates in the range 1° C./min to 100° C./min.

The complete pressing cycle may last between 1 minute and 2 hours, for example between 15 minutes and 1 hour. In the examples, hot pressing was carried out, the pressing cycle lasting 50 minutes, the maximum pressure being applied for 2 minutes.

The hot pressing step may be carried out in a reducing atmosphere or, preferably, in a non-reducing atmosphere, such as an oxidizing atmosphere. If hot pressing is carried out in a reducing atmosphere, an additional oxidation step may need to be performed. This oxidation step should eliminate any materials that have served to create the channels for improving the supply of gas for the electrodes, as well as any pore-forming agents.

One advantage linked to the use according to a powder of the invention and in particular a lanthanum-manganese perovskite powder, resides in the fact that it is not necessary to use pore-forming agents to create a total porosity in the electrode of at least 20% of the total volume of the electrode.

The use of an oxidizing atmosphere may have the effect of oxidizing the metallic nickel contained in the anode or the nickel contained in the wiring that may be present in the various electrodes. An additional reduction step may, however, be carried out in order to cancel the effects of this oxidation. Hot pressing in an oxidizing atmosphere may advantageously reduce the number of additional steps of reduction and oxidation.

Finally, hot pressing may advantageously be carried out without the aid of a ring, matrix or mold for retaining the powder, e.g. a restraining die.

Before shaping, the powders intended for the production of the materials of the electrolyte and the interconnector may be screened in order to select the powder fraction in the range 0.5 micrometers to 3 micrometers.

Typically, at the end of the complete producing cycle, the electrodes and the interconnector have an apparent density of 95% or more of the theoretical density. The anode and the cathode may have an apparent density of 80% of the theoretical density or less. Depending on the material, the granulometry may require a suitable adjustment in order to reach the appropriate density. In general, the electrodes of a stack of elementary cells are composed of particles (agglomerated or otherwise) that are coarser than those of the electrolyte or interconnector products.

Preferably, a stack of elementary cells is produced by hot pressing in a single thermal cycle. In the remainder of this description, the term "thermal cycle" is used for a cycle of heat treatment in a chamber starting at an initial temperature and terminating when the temperature inside the chamber has returned to the initial temperature. Typically, the initial temperature is a low temperature, generally less than 75° C., typically less than 50° C., such as ambient temperature or a temperature in the range 10° C. to 30° C. In particular, the initial temperature is preferably lower than the sintering temperature. Using hot pressing in the production of a solid oxide fuel cell in a single thermal cycle means that a complete, unitary stack of elementary cells, i.e. having its own integrity, can be obtained.

In one of the embodiments, the production of a stack of elementary cells separated by interconnector layers is facilitated by pressing green ceramic products. The term "green ceramic products" means products that have not undergone heat treatment such as sintering, aimed at increasing their density, occasionally to complete densification.

Hot pressing the various components of elementary cells in the form of layers and interconnector layers may thus be carried out on green products, such as shaped powders. Complete densification, or sintering, of the various layers composing the stack of elementary cells including the layers of ceramic interconnector in a single thermal cycle of a hot pressing method can improve the efficiency of the method of producing such a stack.

In accordance with one embodiment, after production is complete, the ceramic interconnector layer has a dense structure, such that the porosity in this layer is less than 5% by volume. As a consequence, the porosity of the ceramic interconnector layer may be low, such as less than 3% by volume, for example less than 2% by volume, or less than 1% by volume.

Further, after carrying out the hot pressing step, the thickness of the interconnector layer formed is generally in the range 10 micrometers to 1000 micrometers, or even in the range 10 micrometers to 200 micrometers, or even less than 100 micrometers. In one embodiment, the thickness of the ceramic interconnector layer is less than 75 micrometers, for example less than 50 micrometers, less than 40 micrometers, less than 30 micrometers or less than 20 micrometers. In particular, the interconnector layer may be flat.

A solid oxide fuel cell stack may thus be produced using a hot pressing technique as described above, with one or more electrode(s) formed from a powder of grains with an elongated shape in accordance with the invention. The solid oxide fuel cell stack may be composed of two, three, four, five, six or even more than 6 elementary cells, an interconnector layer separating each elementary cell and ensuring electrical connection, each elementary cell being composed of a first electrode layer, an electrolyte layer and a second electrode layer.

EXAMPLES

The following non-limiting examples are given with the aim of illustrating the invention.

The powder of Example 1 was produced using a method of the invention, namely:

a) obtaining a solid body of [strontium-doped lanthanum] manganese perovskite by fusion in an arc furnace;

b) crushing the solid body obtained from a) to obtain crushed particles;

c) screening the crushed particles obtained from b) to obtain screened particles with a size over 150 μm;

d) milling the screened particles from c) in a model BLC 200×200 roller grinding mill produced by CLERO, to obtain a powder;

e) screening the powder obtained from d) on a 53 micrometer screen and a 20 micrometer screen, and selecting the fraction included between said two screens;

f) no de-ironing step f);

g) verifying the form factor of a sample of grains from the powder obtained from e).

The powder of comparative Example 1 was produced in order to demonstrate the influence of the distribution of the form factor on the total porosity and the biaxial bending resistance of a porous body produced from said powder.

The powder of comparative Example 1 was produced using the method described for the production of the powder of Example 1, with the following differences:

in step a), the particles of [strontium-doped lanthanum] manganese perovskite were obtained by blowing a composition fused in an arc furnace;

no step b);

in step c), screening of the particles obtained from a) to select particles with a size of less than 100 μm;

no step d);

steps e), f) and g) unchanged.

The particles thus obtained differed from those of the powder of Example 1 only in a different distribution of the form factor R, the granulometric distribution curves of the two examples being substantially similar.

The particles of the powder of comparative Example 1 were more spherical than those of Example 1.

The characteristics of the powders obtained are shown in Table 1 below:

TABLE 1

| Example | Substance constituting more than 99% of the powder | % grains of form factor > 1.5 | % grains of form factor > 2 | $D_{10}$ (μm) | $D_{50}$ (μm) | $D_{90}$ (μm) | $D_{99.5}$ (μm) |
|---|---|---|---|---|---|---|---|
| Comparative Example 1 | $(La_{0.805}Sr_{0.195})_{0.97}MnO_{3-\delta}$ | 32 | 9 | 31 | 52 | 89 | 175 |
| 1 | $(La_{0.79}Sr_{0.21})_{0.96}MnO_{3-\delta}$ | 65 | 28 | 21 | 37 | 76 | 175 |

The amounts of impurities in these two powders are shown in Table 2 below (the numerical values are all percentages):

TABLE 2

| Example | $ZrO_2$ | $Al_2O_3$ | CaO | BaO | $Na_2O$ | $Fe_2O_3$ | $SiO_2$ | C | $SO_3$ |
|---|---|---|---|---|---|---|---|---|---|
| Comparative Example 1 | 0.14 | <0.02 | <0.05 | 0.05 | <0.05 | 0.02 | 0.09 | 0.004 | 0.007 |
| 1 | 0.08 | <0.02 | 0.12 | 0.07 | <0.05 | 0.03 | <0.02 | 0.0075 | 0.0045 |

28 mm diameter porous disks with a thickness of 3 mm were then produced from the powder of Example 1 (powder according to the invention) and from the powder of comparative Example 1 (not in accordance with the invention) by uniaxial hot pressing at a pressure of 69 MPa. The disks obtained thereby then underwent hot pressing in air at 1380° C. with a maximum pressure of 3 MPa applied for 2 minutes.

The surface reactivities of the two powders were substantially identical, which meant that this parameter had no impact on the results measured for the porous disks produced.

Table 3 gives the results of measurements carried out on the porous disks obtained for the biaxial bending strength measured using the ASTM standard C1499-05 and of the total porosity measured by the buoyancy method:

TABLE 3

| Porous disk obtained from powder of: | Total porosity, % | Biaxial bending strength, MPa |
|---|---|---|
| Comparative Example 1 | 34.9 | 12.8 |
| Example 1 | 32.2 | 24.8 |

The examples show that surprisingly, the use of a powder having at least 40% by number of grains with a form factor of more than 1.5 and a 10 percentile, $D_{10}$, of more than 4 micrometers makes it possible to produce a porous disk with a biaxial bending strength 1.9 times greater than that of a porous disk obtained from a powder not having these characteristics, the two porous disks having a total porosity of the same order of magnitude.

These examples also show that an LSM powder according to the invention, containing grains with an elongated shape, is perfectly suited to producing a solid oxide fuel cell cathode with a suitable total porosity and a remarkable strength.

The powder of Example 2 was produced using the method of the invention, namely:

a) obtaining hollow beads of [strontium-doped lanthanum] manganese perovskite with composition $(La_{0.805}Sr_{0.2})_{0.96}MnO_{3-\delta}$ by blowing a composition fused in an arc furnace;

b) advantageously, no step b);

c) screening the hollow beads obtained from a) in order to select beads corresponding to the rejects from a 100 micrometer square mesh screen and that pass through a 500 micrometer square mesh screen;

d) milling the beads screened in c) in a PM400 type rapid planetary mill from RETSCH. 67.5 g [grams] of beads to be milled, 6 cylindrical zirconia-magnesia "balls" with a unit mass of 7.4 g, a diameter of 12.5 mm and a height of 13 mm were added to a 145 mL [milliliters] capacity bowl coated with alumina. The bowl was closed and rotated for 1 minute (planetary motion) at 300 rpm [revolutions per minute] with reversal of the direction of rotation every minute, in order to obtain a powder;

e) screening the powder obtained from d) through a 53 micrometer screen and a 20 micrometer screen and selecting the fraction included between these two screens;

f) no step f);

g) verifying the form factor of a sample of the grains of the powder obtained in e).

The powder of Example 2 obtained had the following characteristics:
- a $D_{10}$ equal to 14.1 micrometers;
- a $D_{50}$ equal to 43.1 micrometers;
- a $D_{90}$ equal to 71.4 micrometers;
- a $D_{99.5}$ equal to 120 micrometers;
- 67.9% of grains, by number, had a form factor R>1.5;
- 30.1% of grains, by number, had a form factor R>2.

The powder of Example 3 was produced using a method that was identical to the method used to produce the powder of Example 2 except for the milling time in step d), which was adjusted to 5 minutes.

The powder of Example 3 thus obtained had the following characteristics:
- a $D_{10}$ equal to 10.1 micrometers;
- a $D_{50}$ equal to 36.2 micrometers;
- a $D_{90}$ equal to 64.9 micrometers;
- a $D_{99.5}$ equal to 110 micrometers;
- 64.3% of grains, by number, had a form factor R>1.5;
- 24.4% of grains, by number, had a form factor R>2.

The present invention is of course not limited to the embodiments described, which are provided by way of illustration.

The invention claimed is:

1. A powder constituted by a set of grains obtained by a process comprising a step of synthesizing a solid body followed by a step of milling the solid body, wherein a 10 percentile, denoted $D_{10}$, of a cumulative granulometric distribution of grain sizes, the grain sizes being classified by increasing size, is 4 µm or more, at least 40% by number of said grains having a form factor (R) of more than 1.5, the form factor (R) of a grain being a ratio between a length and a width of said grain, said powder being constituted, for more than 90% as a percentage by weight, by a substance selected from a manganese perovskite, a lanthanum perovskite, a mixture of manganese perovskite and lanthanum perovskite, a lanthanum-cobalt perovskite ($LaCoO_3$), a lanthanum-iron perovskite ($LaFeO_3$), a lanthanum-manganese perovskite ($LaMnO_3$), a praseodymium-manganese perovskite, a strontium-doped samarium cobaltite, a lanthanide nickelate, a mixture of ruthenium bismuth and erbium bismuth, a mixture of lanthanum-cubic zirconia perovskite, a chromite, a lanthanum titanate, a [niobium-doped strontium] titanate, a [yttrium-doped strontium] titanate, a [strontium-doped lanthanum ] chromo-manganite, a monoclinic zirconia ($ZrO_2$), a partially stabilized zirconia ($ZrO_2$), a cubic zirconia ($ZrO_2$), cerium oxide ($CeO_2$), cerium oxide ($CeO_2$) doped with samarium oxide ($Sm_2O_3$) and/or gadolinium oxide ($Gd_2O_3$), a cermet comprising cerium oxide ($CeO_2$), a cermet comprising [strontium-doped lanthanum] chromite, a cermet comprising partially stabilized zirconia ($ZrO_2$), a cermet comprising cubic zirconia ($ZrO_2$), or by a mixture of said substances.

2. The powder according to claim 1, at least 50% by number of the grains having a form factor of more than 1.5.

3. The powder according to claim 2, at least 60% by number of the grains having a form factor of more than 1.5.

4. The powder according to claim 1, at least 70% by number of the grains having a form factor of more than 1.5.

5. The powder according to claim 1, the 10 percentile ($D_{10}$) being more than 6 µm and less than 50 µm.

6. The powder according to claim 1, wherein:
- $D_{10}$ is more than 8 µm and less than 30 µm; and/or
- $D_{50}$ is more than 10 µm and less than 100 µm; and/or
- $D_{90}$ is more than 30 µm and less than 150 µm; and/or
- $D_{99.5}$ is less than 200 µm;

where $D_{50}$, $D_{90}$ and $D_{99.5}$ denote the 50, 90, and 99.5 percentiles of said cumulative granulometric distribution.

7. The powder according to claim 6, wherein:
- $D_{10}$ is less than 20 µm; and/or
- $D_{50}$ is more than 20 µm and less than 50 µm; and/or
- $D_{90}$ is more than 40 µm and less than 80 µm; and/or
- $D_{99.5}$ is less than 150 µm.

8. The powder according to claim 1, wherein:
- less than 90% of the grains have a form factor (R) of more than 1.5; and/or
- at least 10% and less than 60% of the grains have a form factor of more than 2; and/or
- at least 5% and less than 40% of the grains have a form factor of more than 2.5; and/or
- at least 2% and less than 20% of the grains have a form factor of more than 3;

the percentages being percentages by number.

9. The powder according to claim 8, wherein:
- less than 80% of the grains have a form factor of more than 1.5; and/or
- at least 20% and less than 40% of the grains of the powder have a form factor of more than 2; and/or
- at least 10% and less than 20% of the grains have a form factor of more than 2.5; and/or
- at least 5% and less than 10% of the grains have a form factor of more than 3;

the percentages being percentages by number.

10. The powder according to claim 1 constituted, for more than 90% as a percentage by weight, by a substance selected from a manganese perovskite, a lanthanum perovskite, a mixture of manganese perovskite and lanthanum perovskite, a [strontium and/or calcium and/or magnesium and/or yttrium and/or ytterbium and/or cerium-doped lanthanum]-manganese perovskite, a co-doped lanthanum-manganese perovskite with formulation $La_{1-x-w}(Ca)_{0.2}(Ce)_{w+z}(Mn)_{1-y}(Ms2)_y O_3$ where Ms2 is selected from nickel (Ni) and/or chromium (Cr) and/or magnesium (Mg) and $0.15<x<0.25, 0.1<w<0.2$; $0.03<y<0.2$ and $0<z<0.005$, a [strontium-doped lanthanum]-cobalt perovskite, a [strontium and cobalt-doped lanthanum]-iron perovskite, a lanthanum and/or praseodymium and/or neodymium nickelate, a chromite, a [strontium and/or manganese and/or gallium-doped lanthanum] titanate, a [strontium-doped lanthanum] chromo-manganite, a partially stabilized zirconia, a cubic zirconia, a cermet comprising cerium oxide ($CeO_2$), a ruthenium-[strontium-doped lanthanum] chromite cermet, a cermet comprising partially stabilized zirconia ($ZrO_2$), a cermet comprising cubic zirconia ($ZrO_2$), or by a mixture of said substances.

11. The powder according to claim 1 constituted, for more than 90% as a percentage by weight, by a substance selected from a co-doped lanthanum perovskite-manganese with formulation $La_{1-x-w}(Ca)_{0.2}(Ce)_{w+z}(Mn)_{1-y}(Ms2)_y O_3$ where Ms2 is selected from nickel (Ni) and/or chromium (Cr) and/or magnesium (Mg) and $x=0.2, 0.1<w<0.2; 0.03<y<0.2$ and $0<z<0.005$, a [strontium and/or calcium-doped lanthanum]-manganese perovskite with formula $(La_{(1-x)}M_x)_{(1-y)}MnO_{3-\delta}$ where M is selected from the group composed of strontium, calcium and mixtures thereof, $0<x<0.5$ and $-0.1 \leq y \leq 0.24$ and δ ensures electroneutrality, a lanthanum chromite ($LaCrO_3$), a zirconia partially stabilized with yttrium oxide ($Y_2O_3$) and/or scandium oxide ($Sc_2O_3$) and/or cerium oxide ($CeO_2$), a cubic zirconia, a cermet comprising cerium oxide ($CeO_2$) doped with samarium oxide ($Sm_2O_3$) and/or gadolinium oxide ($Gd_2O_3$), a cermet comprising zirconia ($ZrO_2$) partially stabilized with yttrium oxide ($Y_2O_3$), a cermet comprising cubic zirconia stabilized with yttrium oxide ($Y_2O_3$), or by a mixture of said substances.

12. The powder according to claim 1 constituted, for more than 90% as a percentage by weight, by a substance selected from a [strontium-doped lanthanum]-manganese perovskite, a strontium-doped lanthanum chromite, a zirconia partially stabilized with yttrium oxide, a cubic zirconia stabilized with yttrium oxide ($Y_2O_3$) and/or scandium oxide ($Sc_2O_3$) and/or cerium oxide ($CeO_2$), a cermet of [nickel or cobalt or copper or ruthenium or iridium]-cerium oxide ($CeO_2$) doped with samarium oxide ($Sm_2O_3$) and/or gadolinium oxide ($Gd_2O_3$), a cermet of [nickel or cobalt or copper or ruthenium]-zirconia partially stabilized with yttrium oxide, a cermet of [nickel or cobalt or copper or ruthenium]-cubic zirconia stabilized with yttrium oxide, or by a mixture of said substances.

13. The powder according to claim 1 constituted, for more than 90% as a percentage by weight, by a substance selected from a [strontium-doped lanthanum]-manganese perovskite with formula $(La_{(1-x)}Sr_x)_{(1-y)}MnO_{3-\delta}$ where ($0.15 < x < 0.35$) and ($0 \leq y \leq 0.1$) and $\delta$ ensures electroneutrality, a zirconia partially stabilized with a molar yttrium oxide in the range 3% to 8%, a cubic zirconia stabilized with yttrium oxide, a cermet of nickel-partially stabilized zirconia with a molar yttrium oxide content in the range 3% to 8%, a cermet of nickel-cubic zirconia stabilized with yttrium oxide, or by a mixture of said substances.

14. The powder according to claim 1 constituted, for more than 90% as a percentage by weight, by a substance selected from a [strontium-doped lanthanum]-manganese perovskite with formula $(La_{0.8}Sr_{0.2})_{(1-y)}MnO_{3-\delta}$ where ($0 \leq y \leq 0.1$) and $\delta$ ensures electroneutrality, a cubic zirconia stabilized with a molar yttrium oxide content in the range 8% to 10%, a cermet of nickel-stabilized cubic zirconia with a molar yttrium oxide content in the range 8% to 10%, or by a mixture of said substances.

15. The powder according to claim 1, said selected substance being a [strontium-doped lanthanum]-manganese perovskite with formula $(La_{0.8}Sr_{0.2})_{(1-y)}MnO_{3-\delta}$ where ($0 \leq y \leq 0.1$) and $\delta$ ensures electroneutrality.

16. The powder according to claim 1, said selected substance representing at least 99% of said powder, as a percentage by weight.

17. The powder according to claim 1, constituted by fused grains.

18. The powder according to claim 1, wherein a roller grinding mill is used for the milling.

19. The powder according to claim 1, wherein the synthesizing step comprises sintering, sintering under pressure, hot isostatic pressing, Spark Plasma Sintering, or fusion.

20. The powder according to claim 1, wherein less than 20% of the grains have a form factor of more than 3.

21. A mixture constituted by a first powder according to claim 1 fanned from a first material and a second powder formed from a second material that is different from said first material, the quantity of the first powder being 30% or more by weight of the mixture.

22. The mixture according to claim 21, the first powder being a zirconia powder doped with yttrium oxide and the second powder being a nickel oxide powder.

23. A sintered product obtained by a method comprising shaping the powder according to claim 1, or shaping a mixture constituted by a first powder according to claim 1 formed from a first material and a second powder formed from a second material that is different from said first material, the quantity of the first powder being 30% or more by weight of the mixture.

24. A cathode or an anode comprising the sintered product according to claim 23.

25. The sintered product according to claim 23, having a total porosity of more than 20% by volume.

26. The sintered product according to claim 25, having a total porosity of 25% to 50% by volume.

27. The sintered product according to claim 26, having a total porosity of 30% to 45% by volume.

28. The sintered product according to claim 27, having a total porosity of 30% to 40% by volume.

29. The sintered product according to claim 23, in a form of a layer with a thickness of 1 mm to 2 mm.

30. An elementary cell of a solid oxide fuel cell, comprising:
   i) a cathode intended to be in contact with a source of oxygen in the gaseous form;
   ii) an anode intended to be in contact with a source of gaseous fuel; and
   iii) an electrolyte disposed between the cathode and the anode;
   at least one of said cathode and anode comprising a sintered product according to claim 23.

31. A solid oxide fuel cell comprising at least one elementary cell according to the claim 30.

32. The solid oxide fuel cell according to claim 31, comprising at least two elementary cells and an electrical interconnector disposed between said elementary cells.

33. The solid oxide fuel cell according to claim 32, wherein the electrical interconnector is flat.

34. The solid oxide fuel cell according to claim 32, wherein a thickness of the interconnector is from 10 micrometers to 1000 micrometers.

35. The solid oxide fuel cell according to claim 34, wherein the thickness of the interconnector is less than 200 micrometers.

36. The solid oxide fuel cell according to claim 31, comprising a plurality of elementary cells electrically connected in series.

37. A method of producing a powder according to claim 1, comprising the following steps:
   a) synthesizing a solid body by sintering, isostatic sintering, hot isostatic pressing, Spark Plasma Sintering, or fusion;
   b) optionally, reducing said solid body into a set of particles;
   c) selecting particles with a size greater than a maximum size of grains of the powder to be produced;
   d) milling the particles obtained from step c), and
   e) optionally de-ironing and/or optionally selecting the milled grains.

38. The method according to claim 37, wherein, in order to produce a powder capable of passing through a square mesh screen with a mesh size of O2, in step c) particles that do not pass through a square mesh screen with mesh size O1 and that pass through a square mesh screen with a mesh size of O3 are selected, O1 being greater than O2 and O3 being less than a hundred times O2.

39. The method according to claim 38, wherein O3 is less than ten times O2.

40. The method according to claim 39, wherein O3 is less than four times O2.

41. The method according to claim 37, wherein in step d), a roller grinding mill is used.

42. The method according to claim 37, wherein in step a), the solid body is synthesized by fusion.

43. The method according to claim 38, wherein in step d), hollow beads are milled.

44. A method of producing a powder comprising an operation of mixing:
   a first powder according to claim 1 wherein more than 40% by number of the grains have a form factor (R) of more than 1.5; and
   a second powder with a median form factor (R*) in the range 1 to 1.3;
the quantity of said second powder being determined such that the powder that is manufactured is in accordance with claim 1.

45. The method according to claim 44, wherein the quantity of said second powder represents between 0 and 40% of the weight of the manufactured powder.

46. The method according to claim 44, wherein at least one of said first and second powders is represented by the chemical formula:

$$(La_{(1-x)}M_x)_{(1-y)}MnO_{3-\delta}$$

where:
   M is selected from the group composed of strontium, calcium and mixtures thereof,
   ($0<x<0.5$) and ($-0.1 \leq y \leq 0.24$), and
   $\delta$ ensures electroneutrality.

47. The method according to claim 44, wherein the first and second powders have the same composition.

48. The method according to claim 44, wherein the second powder has a cumulative granulometric distribution in accordance with that of a powder constituted by a set of grains, wherein a 10 percentile, denoted $D_{10}$, of the cumulative granulometric distribution of grain sizes, the grain sizes being classified by increasing size, is 4 µm or more, at least 40% by number of said grains having a form factor (R) of more than 1.5, the form factor (R) of a grain being a ratio between a length and a width of said grain.

49. A method for preparing an anode or a cathode of an elementary cell of a fuel cell, comprising the following steps in succession:
   A) preparing a powder according to claim 1, or preparing a mixture constituted by a first powder according to claim 1 formed from a first material and a second powder formed from a second material that is different from said first material, the quantity of the first powder being 30% or more by weight of the mixture;
   B) shaping said powder to obtain a shaped powder; and
   C) sintering said shaped powder.

50. A method for producing an elementary cell of a fuel cell, comprising the following steps in succession:
   1) producing, using the method according to claim 49, a cathode intended to be in contact with a source of gaseous oxygen and an anode intended to be in contact with a gaseous fuel; and
   2) producing and positioning an electrolyte between the cathode and the anode.

51. A material, comprising:
   the powder according to claim 1, or a mixture constituted by a first powder according to claim 1 formed from a first material and a second powder formed from a second material that is different from said first material, the quantity of the first powder being 30% or more by weight of the mixture,
   wherein the material has a total porosity of more than 25% and a strength of more than 20 MPa, said strength being measured by biaxial bending in accordance with ASTM standard C1499-05.

* * * * *